United States Patent [19]
Miller, Jr. et al.

[11] 3,854,601
[45] Dec. 17, 1974

[54] APPARATUS FOR FORMING PATTERNED LAYERS

[75] Inventors: Frank H. Miller, Jr., Louisville; David L. Witherspoon, Anchorage, both of, Ky.

[73] Assignee: Miller Engineering Corporation, Louisville, Ky.

[22] Filed: July 5, 1973

[21] Appl. No.: 376,741

[52] U.S. Cl............. 214/6 P, 198/31 AC, 198/235, 198/249, 198/271
[51] Int. Cl............................................ B65g 57/24
[58] Field of Search......... 214/6 P, 6 B; 198/31 AC, 198/235, 249, 271

[56] References Cited
UNITED STATES PATENTS

| | | | |
|---|---|---|---|
| 2,847,107 | 8/1958 | Pennington | 198/31 AC |
| 3,085,696 | 4/1963 | Stainforth et al. | 214/6 P |
| 3,442,400 | 5/1969 | Roth et al. | 214/6 P |
| 3,587,876 | 6/1971 | Dahlem | 214/6 P |
| 3,670,906 | 6/1972 | Miller et al. | 214/6 P |
| 3,700,127 | 10/1972 | Kurk et al. | 214/6 P X |

*Primary Examiner*—Robert G. Sheridan
*Assistant Examiner*—Leslie J. Paperner

[57] ABSTRACT

Discloses an apparatus and a process for forming patterned layers of rectangular objects on a conveyor for subsequent loading onto a pallet located on an elevator. The pallet is located on a vertically moving elevator which is incrementally lowered to receive successive layers of mirror image or opposite hand patterns. The apparatus of this invention functions to receive articles from a feed conveyor, turn said articles alternately transversely on a second conveyor by turning said article around a center of rotation located at the distal corner opposite to the direction of rotation of said article. Successive articles are turned transversely to either side of said conveyor and selected articles are turned again so as to lie parallel and laterally spaced from their original line of travel. The articles which are twice turned determine the pattern and are oppositely located for successive patterned layers so as to form opposite hand or mirror image patterns.

11 Claims, 18 Drawing Figures

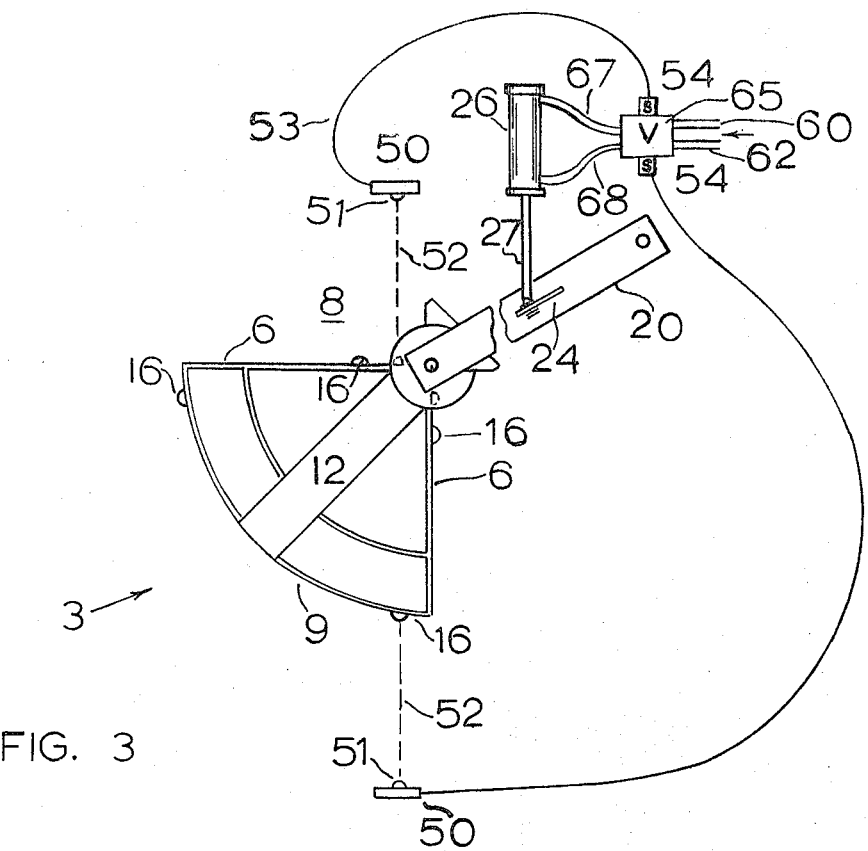
FIG. 3
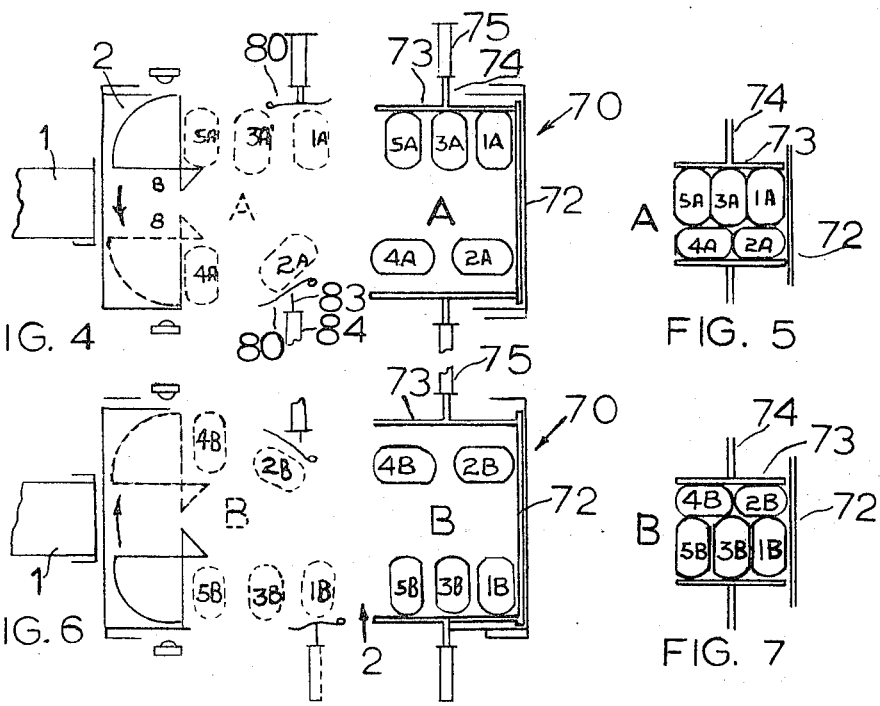
FIG. 4
FIG. 5
FIG. 6
FIG. 7

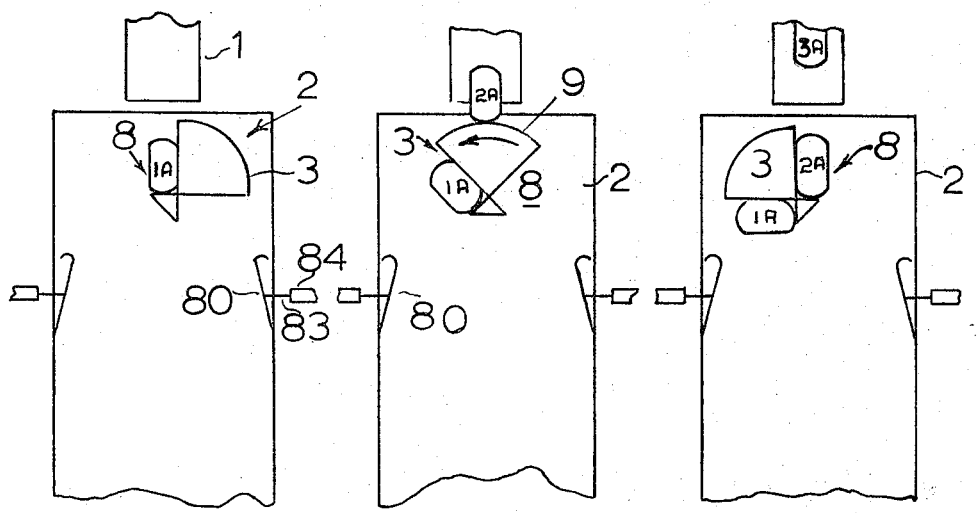
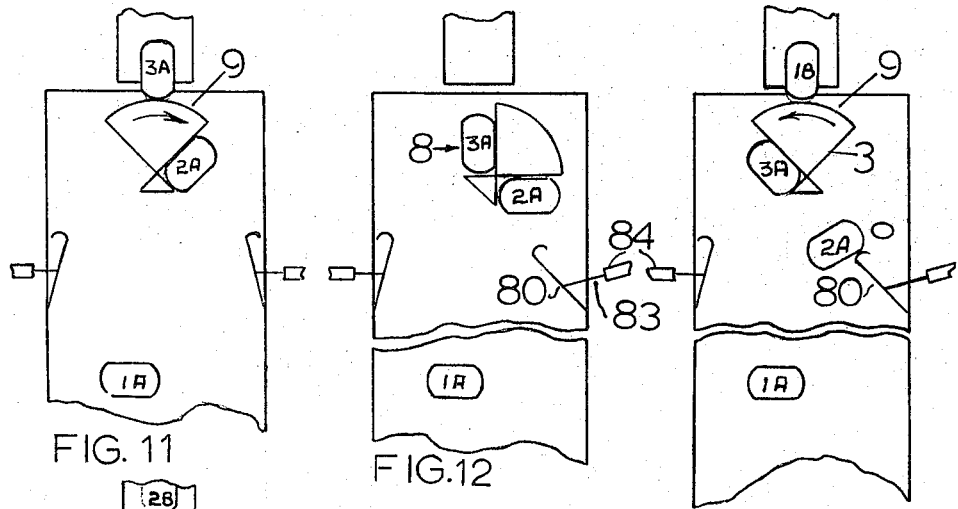
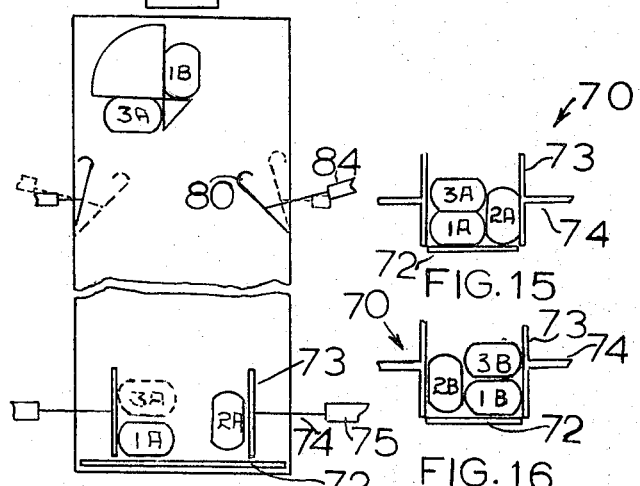
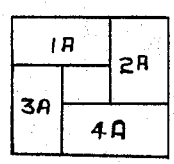
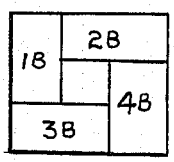

APPARATUS FOR FORMING PATTERNED LAYERS

FIELD OF THE INVENTION

This invention relates to an article loading system and has for its object to provide a completely automatic system for forming mirror image patterned layers of cartons, bags or the like received from one conveyor on a second conveyor and which may be gravitationally loaded onto pallets on a vertically movable elevator which is incrementally lowered to receive successive layers of said articles.

DESCRIPTION OF THE PRIOR ART

Present day material handling is based upon the use of pallets which are portable platforms having a size approximately 4' × 4'. Previously pallet loading has been performed by hand labor. Recently, there has been introduced into the art a series of automatic machines for loading pallets. With these machines, empty pallets are fed into one side, and articles such as cartons, bags or boxes are fed in on the other side in the form of patterned layers onto the pallet supported on a vertically movable elevator. This elevator is incrementally lowered to receive successive layers of patterns. Examples of the pallet loading machines are as follows: U.S. Pat. No. 2,401,592 to Van Stocker; U.S. Pat. No. 2,633,251 to Bruce; U.S. Pat. No. 3,164,080 to Miller, U.S. Pat. No. 2,508,861 to Jessen; U.S. Pat. No. 2,655,271 to Cole; U.S. Pat. No. 2,813,638 to Miller. Other Patentees have addressed themselves to the problem of forming patterns on the conveyor. Examples of there are as follows: U.S. Pat. No. 1,778,621 to Beatty; U.S. Pat. No. 2,598,222 to Cahners et al.; U.S. Pat. No. 2,525,132 to Herts, et al.; U.S. Pat. No. 2,633,521 to Bruce; U.S. Pat. No. 2,716,497 to Wahl, et al; U.S. Pat. No. 2,841,433 to Padgin, et al.; and U.S. Pat. No. 3,442,400 to Roth, et al. These automatic stacking and pattern forming machines involve a series of complex electrical controls involving photoelectric cells, electric relays, stepping switches, counting mechanisms and other intricate mechanisms for keeping track of and selectively turning articles to form a patterned layer. A mirror image or opposite hand pattern is formed in the next successive layer for deposit on said first patterned layer on the pallet on the elevator platform. Furthermore, an intricate and extensive system of controls is necessary to determine when to retract the stripper plate or roll table so as to deposit the successive patterned layers on the elevator. While these machines have operated satisfactorily, nevertheless, such machines operate in packaging plants — in a dusty environment — and are subjected to harsh vibrations and jolts. This creates a considerable maintenance problem for the delicate and intricate controls utilized in such machines. In our U.S. Pat. No. 3,670.906, dated June 20, 1972, we disclosed a turning mechanism which selectively turns bags or cartons on an endless conveyor so as to form on the conveyor a spaced but patterned layer. The spaced layer came into contact with a fixed stop located over the elevator, and the items remained there until an aperture in the conveyor came into registry with the pallet located on the elevator below the conveyor. At that time, the patterned layer was gravitationally fed through the aperture onto the pallet on the elevator waiting below.

The turning mechanism of said patent was based upon turning a designated number of articles in one direction and then raising of the mechanism to let other articles pass unturned. It was thus necessary to allow the bags on the feed conveyor to be stopped, awaiting entry into the turning mechanism after completing the turning of one bag.

SUMMARY OF THE INVENTION

According to this invention, a turning member containing two article receiving recesses is provided so that an article fed from the feed conveyor is fed into one article receiving recess and turned while the turning member simultaneously blocks the passage of the next article from the feed conveyor. Upon completion of the turn so that the first article is transversely placed relative to its original line of travel, the succeeding article automatically feeds into the other article receiving recess for turning to the opposite side of the conveyor. The articles are turned around a center of rotation located at the distal corner of each article opposite to the direction of rotation of the desired turn. In this manner, the arc of the turn is such that the turned article does not drag against or touch the succeeding article on the feed conveyor and allows it to be blocked by the blocking member provided by the turning mechanism. By the simple expedient, then, of providing turning stations on either side of the conveyor downstream from the original turning station, selected articles can be turned a second time to form the pattern downstream against the fixed stop provided as in our previous U.S. Pat. No. 3,670,906. At the same time, a pattern compressor and locator, such as disclosed in said previous patent compresses and closes the pattern over the pallet. By judicious arrangement of the patterns, we have found that the machine can be set to turn designated articles in each pattern a second time so as to provide an automatic method of forming opposite hand or mirror image patterns of successive patterned layers.

BRIEF DESCRIPTION OF THE DRAWINGS

FIG. 3 is a diagrammatic plan view illustrating the relationship of the photoelectric cells to the reflectors of the turning member and to the valve controlling the pneumatic lines to the fluid motor which moves the support arm of the turning member.

FIG. 4 is a fragmentary diagrammatic plan view illustrating the relationship of the feed conveyor to the main conveyor and illustrating further the formation of a five-bag pattern over the elevator.

FIG. 5 illustrates the pattern locator and closing members closing the pattern over the elevator pursuant to the method disclosed in our U.S. Pat. No. 3,670,906.

FIG. 6 is a fragmentary diagrammatic plan view illustrating the formation of a five-bag pattern of an opposite hand or mirror image to that illustrated in FIG. 4.

FIG. 7 illustrates again the closing rams closing the pattern over the elevator.

FIGS. 8 through 15 illustrate step-by-step formation of a three-bag pattern and illustrate in FIG. 14 the first bag of an opposite hand pattern feeding into the machine.

FIG. 16 illustrates the opposite hand or mirror image patterned layer automatically formed by the apparatus of this invention.

FIG. 17 illustrates another variation of a four-article open pinwheel pattern which may be formed by the apparatus of this invention.

FIG. 18 illustrated the opposite hand or mirror image open pinwheel pattern to the pattern formed in FIG. 17.

DESCRIPTION OF THE PREFERRED EMBODIMENT

Figure 1:
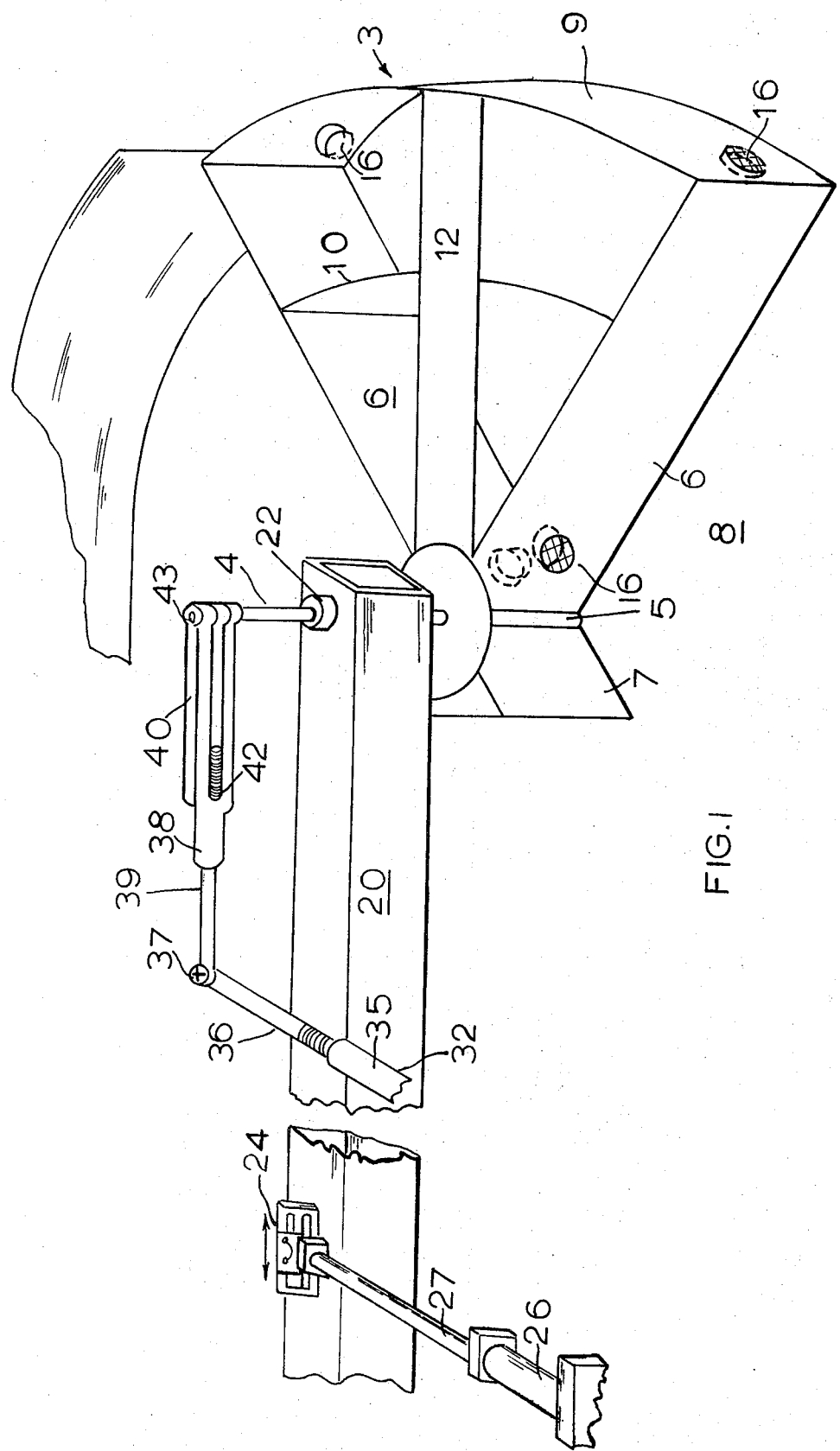
FIG. 1 is a view in perspective of the turning member of this invention shown in blocking position.

As previously indicated, the major difference in the apparatus of this invention and the apparatus of the invention disclosed in our previous U.S. Pat. No. 3,670,906 is in the turning member. Basically, the turning member of No. 3,670,906 operated to turn selectively certain articles transversely to one side of the conveyor or the other and to allow other articles to pass unturned. According to this invention, however, each article entering the pattern forming conveyor 2 is turned to one side of the conveyor or the other so that each item lies transversely to its originally line of travel and laterally spaced therefrom. Accordingly, it is necessary to re-turn or turn twice articles on one side of the conveyor or the other to form the mirror image pattern. The advantage, however, lies in the fact that the articles are turned around a center of rotation formed by the distal corner of the article located opposite to the direction of rotation of the article. Secondly, the turning member contains two receiving recesses separated by a blocking member so that a succeeding article on the feed conveyor 1 is blocked while the other item is being turned. Further, as soon as the turn is completed, the succeeding article feeds into the article recess on the opposite side of the turning member, and then it is turned to the opposite side of the conveyor while the succeeding article is again blocked.

As indicated, the feed conveyor is indicated generally by 1, while the pattern forming conveyor is indicated generally by 2. Since these conveyors are of the endless belt variety as those indicated in our previous patent, they have not been illustrated in detail but preferably operate in an identical manner, containing in the pattern forming conveyor a pattern compressor and locator 70, a fixed stop 72 and pattern closer 73 powered by piston 74 from cylinder 75. This invention, however, is not limited to this configuration since it is primarily concerned with the turning mechanism and the formation of patterns on a conveyor which may be closed by other methods or which may be conveyed to another conveyor for disposition other than on a pallet.

Referring now to FIG. 1, the turning member 3 is turned by drive shaft 4 which forms a center of rotation 5 from which legs 6 and 7 extend, forming an article receiving recess 8 defined by legs 7 and 6 on the two sides. A curved piece of sheet metal is welded to extending leg 6 and forms a reinforcing blocking member 9, and the two legs 6 are further reinforced by a reinforcing intermediate member 10. A central reinforcing member 12 ties the drive shaft 4 and the reinforcing members 9 and 10 together to strengthen same. The turning member is powered by means of a large support arm 20 which is pivotably mounted at point 21 to the frame of the apparatus. The free end of the support arm 20 contains a collar 22 in which the drive shaft 4 is rotatably journaled. A slotted lug 24 is located along the intermediate portion of the shaft of support arm 20, and a cylinder 26 anchored at one end and containing extending piston rod 27 is fastened at point 28 to the slotted lug to move the support arm 20 through a limited arc. Thus, as the piston rod 27 retracts, the support arm 20 moves in one direction, and as the piston rod 27 extends it moves in still another.

Figure 2:
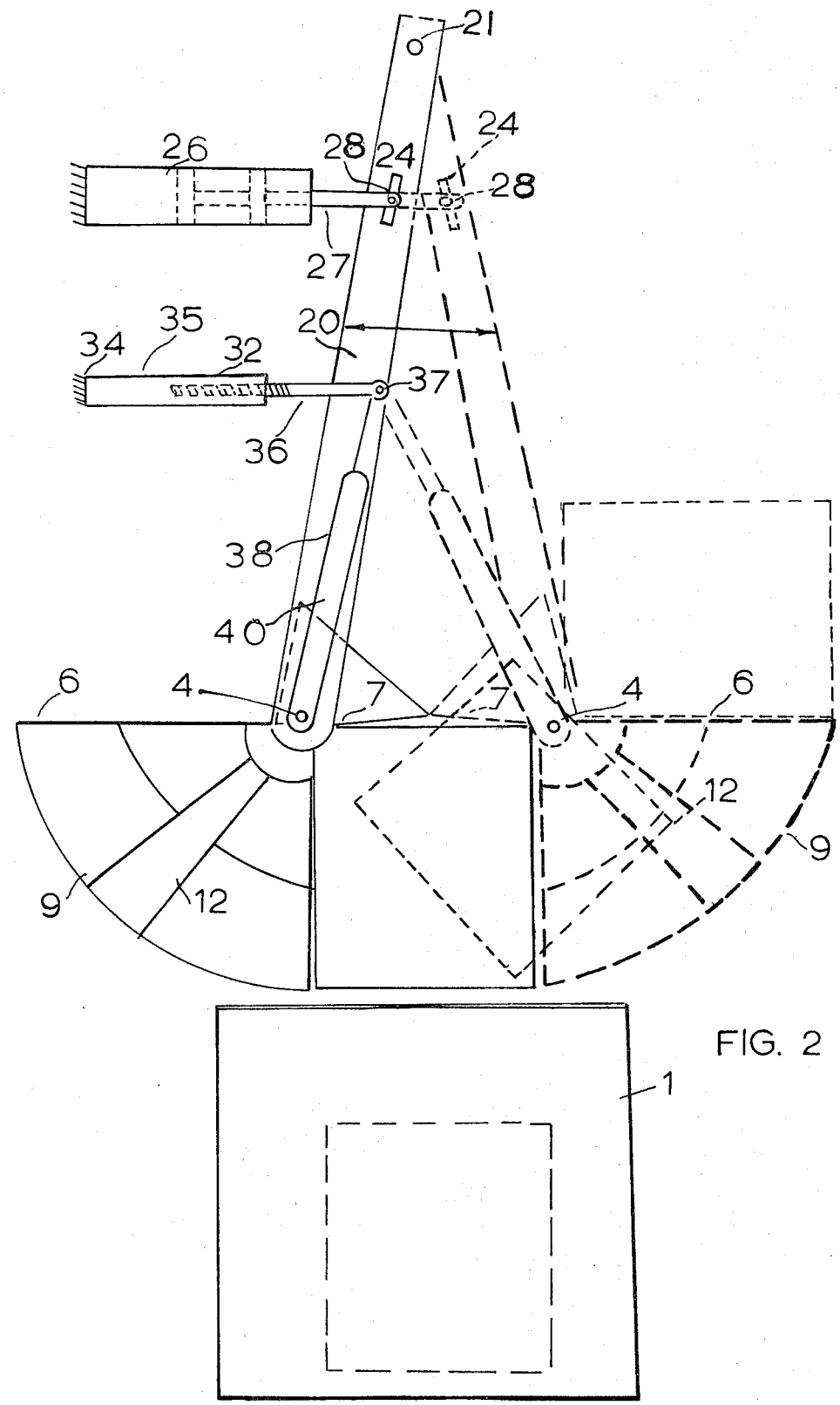
FIG. 2 is a plan view illustrating the relation of the feed conveyor to the turning member and demonstrating the turning member of this invention in full lines in one position and in phantom lines in a second position and showing further the relationship of the support arm and the articulated linkage to each of said positions.

The drive shaft 4 is driven by a reaction of the support arm 20 and a two-arm articulated linkage consisting of reaction arm 32 and work arm 38. The reaction arm is anchored at point 34 and contains a sleeve 35 in which a threaded shaft 36 is adjustably fitted. The reaction arm 32 is pivotably connected a point 37 to the work arm 38 which again consists of a threaded shaft 39 adjustably fitted into a threaded bore 42 in the bight portion of a yoke or clevis member 40 which is operatively connected at point 43 to the drive shaft 4. By retraction or extension of piston rod 27, the support arm 20 moves at its free end through a limited arc, thus moving the work arm 43 as illustrated in FIG. 2 to turn the turning member 3 in one direction or the other. The pivot point 37 remains essentially constant, but, however, can be adjusted to move slightly for variations in the swing of the turning member 3. The work arm 38 can be shortened to increase the swing of the rotation of turning member 3 or can be lengthened to decrease the arc through which the turning member swings. Further, the reaction arm 32 can be shortened or lengthened to change the point at which the turning member begins to turn and is used primarily to center the turning member in the position shown in FIG. 1. It will, of course, be further apparent that movement of the piston rod along the slot of lug 24 will allow adjustment in the arc through which the free end of the support arm 20 swings, again affecting the swing of the turning member 3 through the rotation of drive shaft 4.

Referring now to FIG. 3, the two legs 6 of the turning member 3 contain reflector members 16 embedded therein, and the block member 9 contains reflector members 16 which are used to reflect a beam of light from light source 51 and photoelectric cell 50. The reflected beam 52 thus indicates that the article receiving recess 8 is open, awaiting delivery of an article. As the article arrives in the article receiving recess 8, the reflected beam of light 52 is broken, thus sending a signal through lead 53 to actuate solenoid 54 of valve 65. The valve 65 controls lines 60 and 62 which are the inlet and exhaust lines respectively to the cylinder 26. Line 67 runs to the rear of the cylinder 26 and thus acts to extend the piston rod 27 whereas line 68 runs to the front of the cylinder 26 and acts either as an inlet or exhaust, depending upon whether the piston contained in the cylinder 26 is being retracted or extended. As shown in FIG. 3, the pneumatic line 67 is connected to the inlet line 60, thus extending the piston rod 27 and the air from the front of the cylinder is being exhausted through line 68 through valve 65 to outlet exhaust 62.

Referring now to the drawings, FIG. 4 illustrates diagrammatically the relationship of the feed conveyor to the main conveyor and the formation of a normal five-bag pattern. The bags indicated in phantom lines show the relationship as they are received and in full lines their position at the pattern compression and locating station 70. Please note now as the bag 1A enters the conveyor it fits into the bag receiving recess 8 and is turned clockwise transversely of its original line of travel. Bag 2A as it is received in the recess 8 is turned counterclockwise to the other side of the conveyor, and as is shown in dotted lines is now in contact with the deflector member 80 of the turning station to be re-turned so that its longitudinal axis is parallel to its original line of travel. Thereafter, bag 3A which has been blocked from entering the conveyor 2 by means of blocking member 9 of the turning member enters into the recess 8 and is turned clockwise. Bag 4A then enters the other recess 8 and is turned counterclockwise to be re-turned as it comes into contact with the deflector member 80 pivoted outwardly by means of piston 83 of cylinder 84. Thus, the open five-bag pattern A is shown in position over the elevator below and is ready to be closed by the extension of piston rod 74 of cylinder 75 against the compressor member 73. The closed pattern A is thus shown in FIG. 5. The opposite pattern B is formed as illustrated in FIG. 6 and is closed over the pallet on the vertically moving elevator as illustrated in FIG. 7.

Taking the formation of a pattern step-by-step, FIGS. 8 through 15 show the formation of a three-bag pattern. As is shown in FIG. 8, bag 1A forming pattern A has been received in the article receiving recess 8 of turner 3. In FIG. 9, the bag 1A is shown being turned counterclockwise by the turning member 3 while blocking member 9 blocks the entrance of bag 2A on the conveyor 2. FIG. 10 shows the bag 1A being completely turned and the entrance of bag 2A into the article receiving recess 8 of turner 3, and the approach of bat 3A on conveyor 1. FIG. 11 shows the bag 2A being turned clockwise while bag 3A is being blocked by the blocking member 9 of the turning member and 1A is approaching the fixed stop 72 of the pattern compressor and locating station 70. FIG. 12 illustrates that bag 2A has been completely turned so it lies transversely on the opposite side of the conveyor 2 and bag 3A has entered conveyor 2 and is in the article receiving recess 8. This, of course, breaks the reflected beam 52, thus signaling through the photoelectric cell the actuation of one of the solenoids to move the valve 65 to actuate the cylinder 26. This is shown in FIG. 13, where bag 3A is being turned counterclockwise while bag 2A has come into contact with the deflector member 80 to turn twice so that its longitudinal axis is parallel to its original line of travel. It will also be noted that bag 1B starting the opposite pattern is now being blocked by blocking member 9 of turning member 3. Referring now to FIG. 14, bag 3A has completed its turn and is shown in phantom lines moving toward the position as shown in full lines at the pattern compression and locator station 70 while bag 1B has entered the article receiving recess of the turner 3 and has broken the beam of light to begin its turn in a clockwise direction. Simultaneously, the deflector member 80 on the right-hand side of the conveyor has been retracted through its pivot point 83 to the phantom lines shown so that bag 1B of the opposite pattern will be turned once while bag 2B will be twice turned but on the opposite side of the conveyor to form the mirror image or opposite pattern, illustrated in FIG. 16. FIG. 15, of course, illustrates the pattern A with the compressor ram 73 powered by piston rod 74 from cylinder 75 closing the pattern against fixed stop 72 over the elevator located below.

As previously indicated, other patterns can be formed; however, the five- and three-bag patterns are unique in that they automatically reverse themselves so that in the case of the five-bag patterns bags 2A and 4A are twice turned in one pattern while bags 2B and 4B are twice-turned in its mirror image pattern B. By the same token, with the three-bag pattern, bag 2A is twice turned on the right-hand side of the conveyor while bag 2B is twice turned on the left hand side of the conveyor. Thus, the only compensation necessary to be made is the extension or retraction of the deflector member 80 of the turning station at the end of a particular pattern. This can be done by well known control devices and need not be illustrated here as such devices are illustrated in some detail in our previous U.S. Pat. No. 3,670,906.

It will be apparent, of course, the the four-bag pattern which is quite often referred to as an open pinwheel is not quite so simple as the three- and five-bag pattern, requiring that alternately bags 2A and 3A be twice turned on opposite sides of the conveyor in one pattern and bags 1B and 4B be alternately turned on opposite sides of the conveyor for the second pattern. Of course, if the second pattern is produced first, then the bags 1B and 4B are twice turned on opposite sides of the conveyor whereas in the subsequent pattern bags 2A and 3A are alternately twice turned on opposite sides of the conveyor for the second pattern. This, of course, requires a stepping switch or other mechanism well known in the art such as has been previously indicated in the patents mentioned under "Prior Art."

One of the basic advantages of this invention is the speed at which items can be fed onto the pattern forming conveyor. There is no need for a stop plate at the feed conveyor because the blocking member 9 of the turning member automatically blocks the succeeding bag as it approaches the pattern forming conveyor 2. As the turn of one bag is completed, the opposite quadrant forming an article receiving recess 8 is available for entry of that succeeding bag, and since the center of rotation of the bag or carton alternately is reversed, lying at the distal corner opposite to the direction of rotation, the bag being turned does not touch or drag against the succeeding bag even though it is directly adjacent on the feed conveyor. For this reason, then, the blocking member 9 of the turning effectively blocks the succeeding bag until the turn is completed, at which time it immediately fits into the article receiving recess, breaks the light beam reflected from the light source to the photoelectric cell and thus signals extension or retraction of the piston rod to move the support arm and power the movement and turning of the turning member 3.

Many modifications will occur to those skilled in the art from the detailed description hereinabove given and such description is meant to be exemplary in nature and non-limiting except so as to be commensurate in scope with the appended claims.

We claim

1. A pattern forming device for stacking patterned layers of articles onto a pallet, comprising:
   A. an endless conveyor, including a receiving zone for receiving articles, a loading zone comprising an aperture in said endless conveyor through which said articles gravitationally pass onto said pallet, and a fixed stop disposed over the terminal border of said pallet for stopping said articles and to maintain said articles in fixed position for loading onto said pallet through said aperture.

B. the improvement in said pattern forming device of:
1. a first turning station for turning articles clockwise and counterclockwise to both sides of their original line of travel along the long axis of said conveyor so that each turned article lies laterally spaced from the center line of said conveyor and with each turned article's longitudinal axis turned at about 90 degrees from the center line of said conveyor;
2. a pair of second turning stations, one on either side of said conveyor operative to turn articles a second time so that the longitudinal axes of the twice turned articles on one side are parallel and laterally disposed to their original line of travel and normal to the longitudinal axes of the once turned articles on the other side of said conveyor, and,
3. a pattern closer and locator for pushing articles on either side of said conveyor together so as to close the pattern and locate a patterned layer of said articles over said pallet.

2. A pattern forming device, as defined in claim 1, in which said first turning station comprises:
A. a turning member including an article receiving recess;
B. means to turn said turning member clockwise and counterclockwise, which comprises:
1. a support arm pivotably mounted at one end and movable through a limited arc at its free end,
2. power means for moving said support arm,
3. a drive shaft rotatably journaled in the free end of said support arm and operatively connected to said turning member for turning said member clockwise and counterclockwise,
4. an articulated two-arm linkage pivotably joined together and mounted at one end to a fixed point and operatively connected at the other end to said drive shaft and responsive to the movement of said support arm for turning said drive shaft of said turning member.

3. A pattern forming device, as defined in claim 2, in which said turning member comprises:
A. a center of rotation,
B. legs projecting radially from said center and forming quadrants,
C. two alternate quadrants forming alternate receiving recesses, and,
D. reinforcing blocking members extending between the radially projecting legs of said remaining quadrants.

4. A pattern forming device, as defined in claim 3, in which
A. said reinforcing blocking members are curved sheet metal members welded to the projecting legs of said turning member.

5. A pattern forming device, as defined in claim 2, in which said means for moving said support arm comprises a fluid driven motor comprising a cylinder, a reciprocating piston, and a piston rod extending outside of said cylinder.

6. A pattern forming device, as defined in claim 2, the further improvement in said first turning station which comprises:
A. a sensing means in operative relation with said turning member for sensing the arrival of an article in said article receiving recess and for activating said power means which comprises,
1. a light source directed toward said turning member,
2. a reflector mounted in said turning member for reflecting a beam of light from said light source,
3. a photoelectric cell in alignment with said reflector for receiving a reflected beam of light,
4. a switch in operative relation with said photoelectric cell and with said power means so as to actuate said power means when the reflected beam of light is broken by arrival of an article in said turning member.

7. A pattern forming device, as defined in claim 2, in which
A. said articulated two-arm linkage comprises:
1. a reaction arm mounted to a fixed point, and,
2. a work arm pivotably mounted at one end to said reaction arm and at the other to said drive shaft for said turning member,
3. the improvement of adjustment means for lengthening or shortening said work arm so as to decrease or increase the arc through which said drive shaft is rotated.

8. A pattern forming device, as defined in claim 7, in which said means for lengthening or shortening said work arm comprises a threaded yoke into which said work arm is threadably connected.

9. A pattern forming device, as defined in claim 8, in which said yoke contains a threaded bore in its bight portion through which said work arm projects for adjustable connection.

10. A pattern forming device, as defined in claim 2, in which said articulated two-arm linkage comprises:
1. a reaction arm mounted to a fixed point, and,
2. a work arm pivotably mounted at one end to said reaction arm and at the other to said drive shaft for said turning member,
3. the improvement of adjustment means for lengthening or shortening said reaction arm.

11. A pattern forming device, as defined in claim 1, in which
A. each of said second turning stations comprises:
1. a deflecting bar diagonally disposed relative to the direction of said conveyor,
2. means for moving said defecting bar in and out of the path of articles, comprising:
a. a fluid motor, including:
1. a cylinder casing and piston, and,
2. a piston rod extending from said cylinder casing.

* * * * *